Feb. 12, 1946.        J. M. ALEXANDER        2,394,528
AUTOMATIC LIQUID VENDOR
Filed Oct. 9, 1939        5 Sheets-Sheet 1
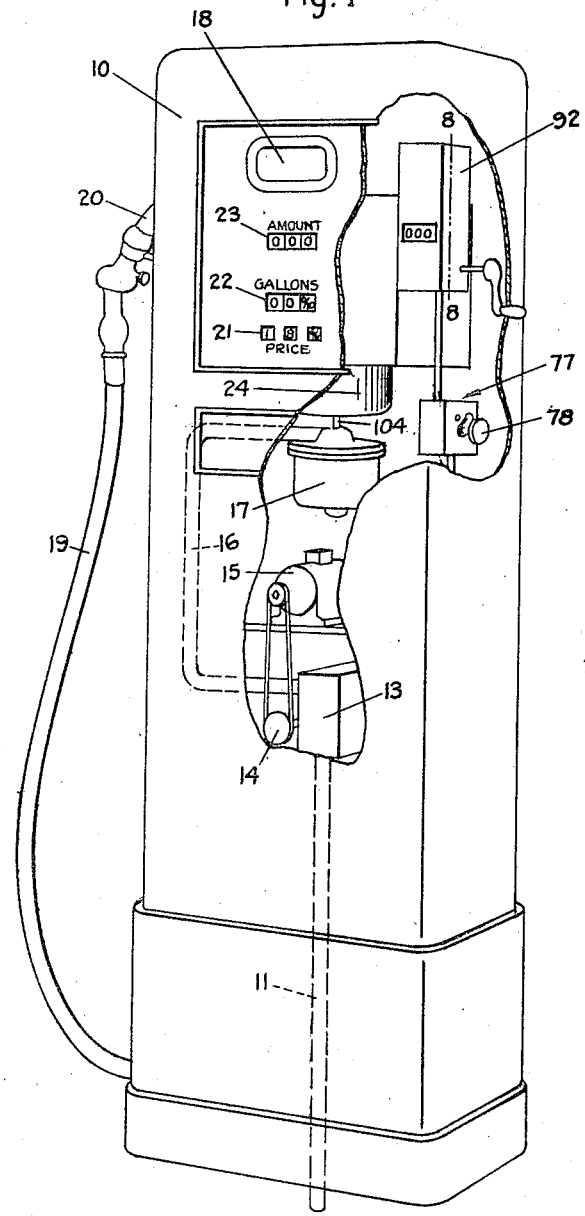
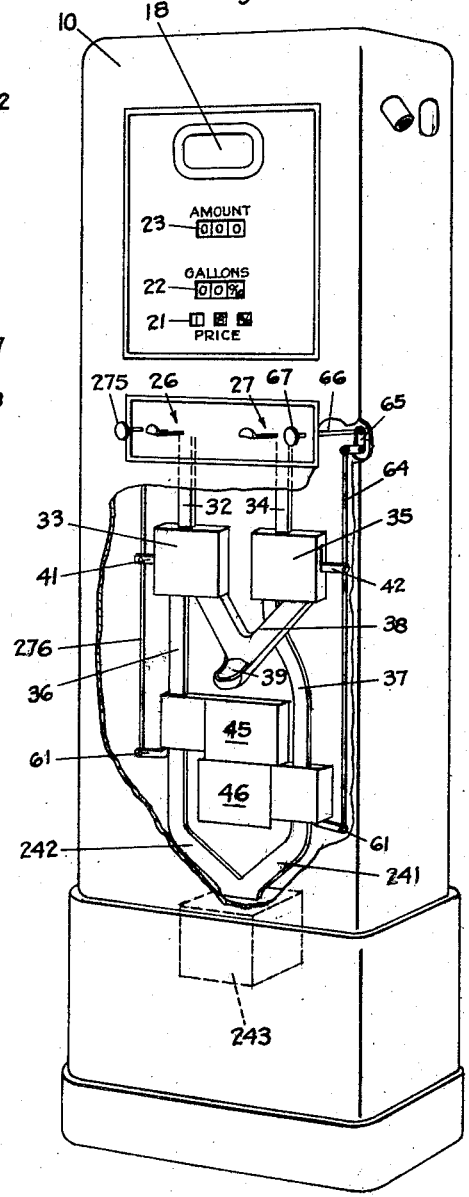
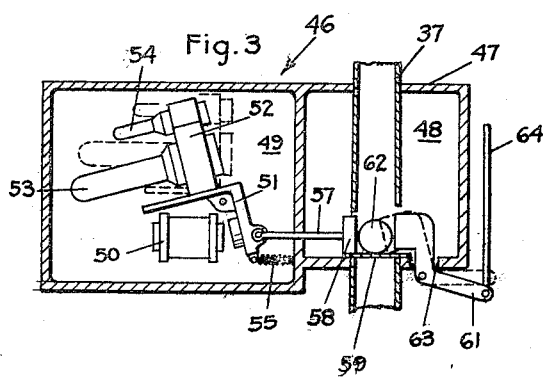
INVENTOR.
John M. Alexander
BY
ATTORNEY.

Feb. 12, 1946.         J. M. ALEXANDER         2,394,528
AUTOMATIC LIQUID VENDOR
Filed Oct. 9, 1939         5 Sheets-Sheet 2

INVENTOR.
John M. Alexander
BY Emil T. Lange
ATTORNEY.

Feb. 12, 1946.　　J. M. ALEXANDER　　2,394,528
AUTOMATIC LIQUID VENDOR
Filed Oct. 9, 1939　　　5 Sheets-Sheet 3
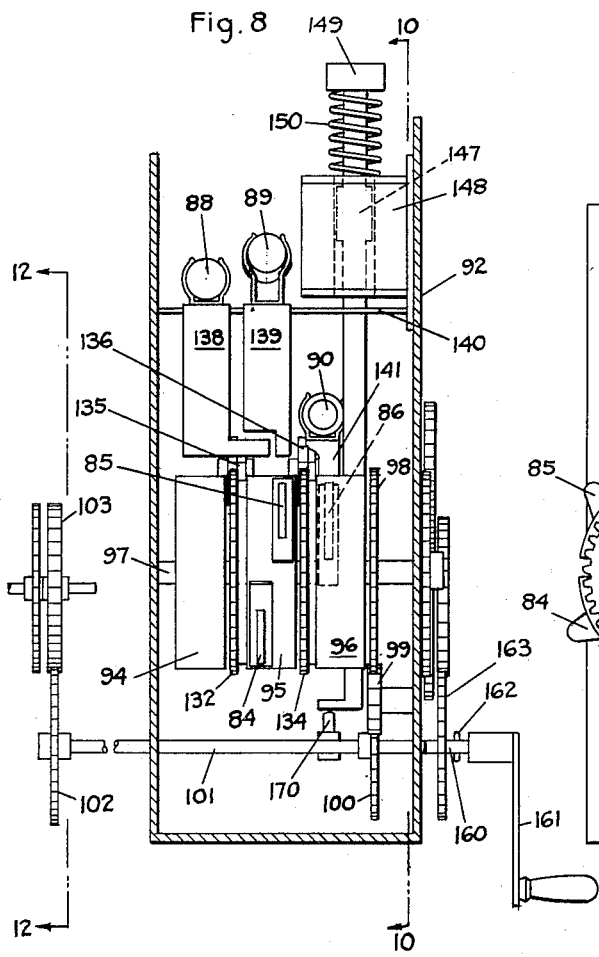
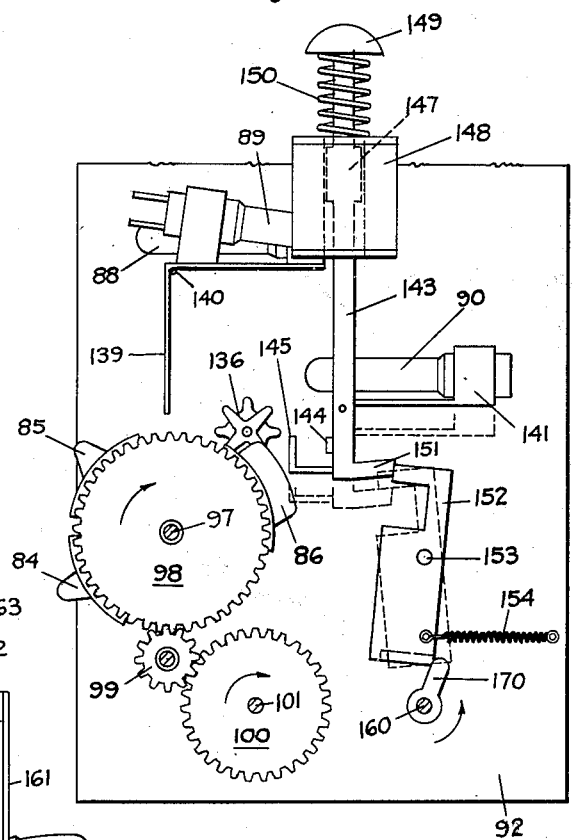
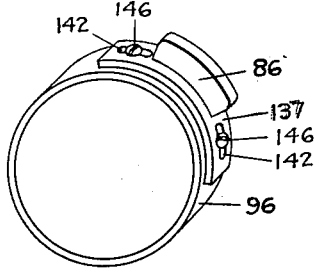
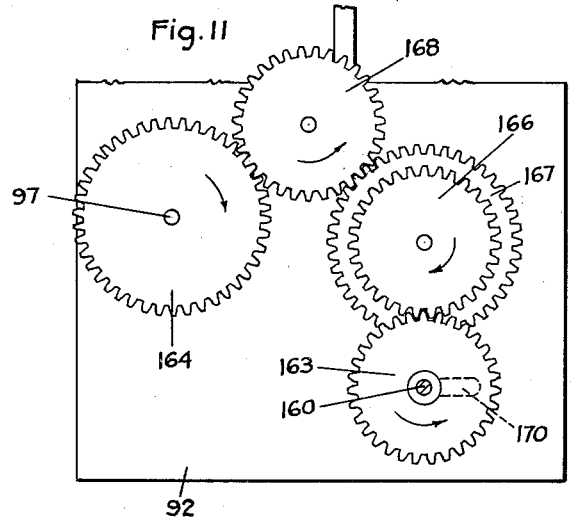
INVENTOR.
John M. Alexander
BY
ATTORNEY.

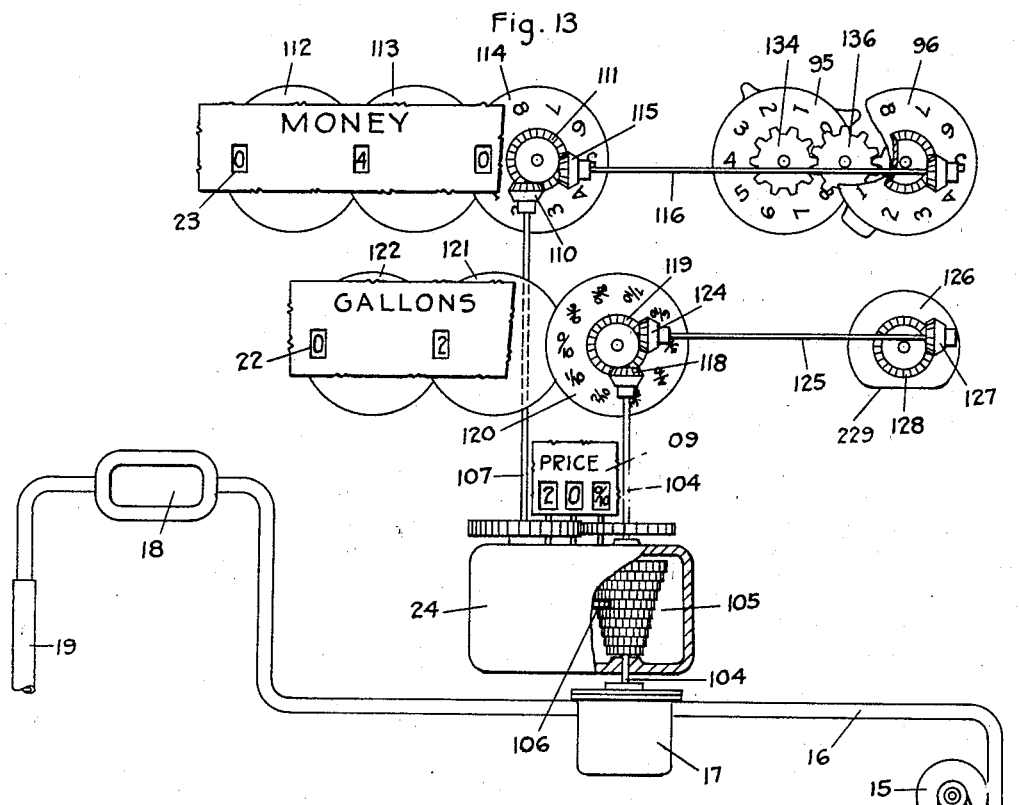

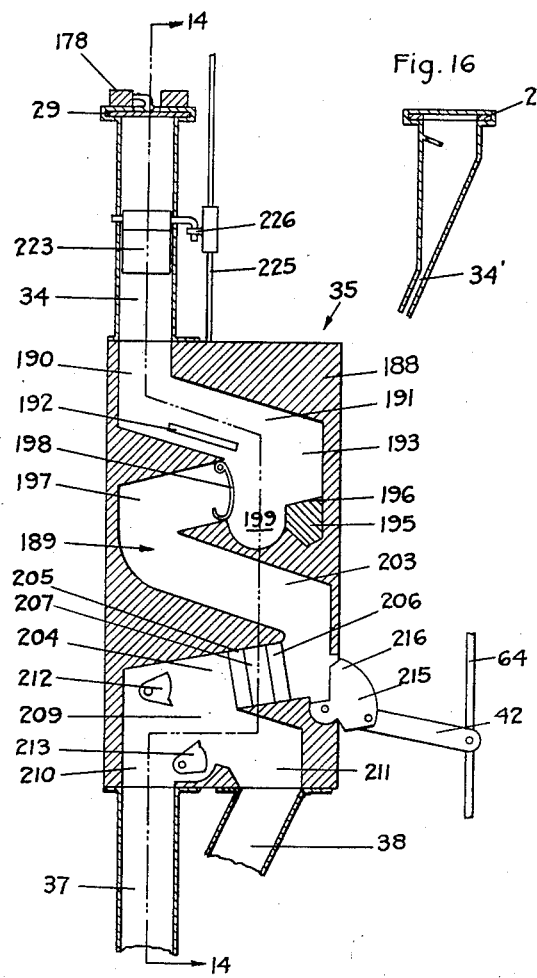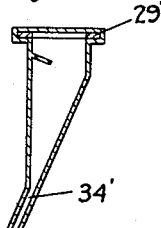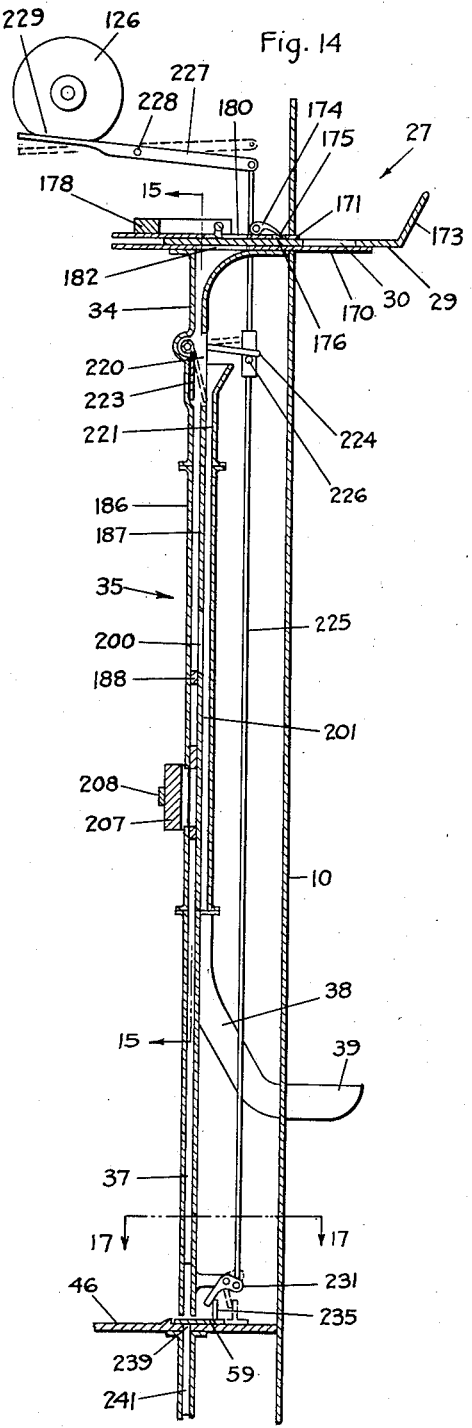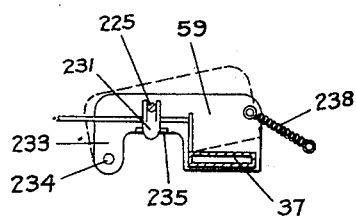

Patented Feb. 12, 1946

2,394,528

UNITED STATES PATENT OFFICE 2,394,528

AUTOMATIC LIQUID VENDOR

John M. Alexander, Lincoln, Nebr.

Application October 9, 1939, Serial No. 298,602

14 Claims. (Cl. 194—82)

The present invention relates to a liquid vending machine and more particularly to one primarily adapted for dispensing gasolines or similar liquids.

The invention is particularly concerned with the computing type of gasoline pump, and is concerned with means for making this pump entirely automatic and coin-operated, so as to make the pump available to drivers at night or at other times when the attendant is not in the filling station.

One object of the present invention is to provide a liquid dispensing machine wherein any one of several predetermined amounts of liquid can be dispensed by depositing a coin corresponding to the proper amount.

A further object of the invention is to provide in such machine the means whereby a second coin cannot be inserted while the dispensing operation is in progress.

A further object of the invention is to provide a liquid vending machine of the computing type and having a different indicia bearing wheel for each digit of the price of the dispensed liquid in which provision is made for delivery of an amount the last digit of the price of which is a number other than zero.

A further object of the present invention is to provide an arrangement such as set forth in the last object in which upon the price indicating wheels reaching a position corresponding to the first digit of the desired amount of fluid, an act preparatory to the termination of the dispensing operation is performed, and wherein upon the wheel bearing the final digits reaching a position corresponding to the last digit of the desired price, the dispensing operation is immediately terminated.

A further object of the present invention is to provide a new and novel dispensing mechanism in which the dispensing operation is controlled by a relay which is manually moved to its energized position only in the presence of a coin, and which, when so moved to its energized position, establishes a holding circuit for itself.

A further object of the present invention is to provide a vending machine such as set forth above, in which the coin forms a link between a manually operated lever and an actuating member for the relay armature.

A further object of the invention is to provide a vending arrangement of the type described in a liquid vending machine, wherein the relay controls the operation of a motor driving a liquid dispensing pump.

A still further object of the invention is to provide an arrangement such as set forth in the immediately preceding objects, in which the manual means for moving the relay into its energized position in the presence of a coin, is also effective for the return of the coin if not accepted by the machine.

A still further object of the present invention is to provide a liquid vending machine which by a simple switch operation can be changed from automatic to manual operation, or vice versa.

A still further object of the present invention is to provide a vending machine employing a new and novel combination of slug detecting features, resulting in an extremely efficient slug detecting mechanism.

Other objects of the present invention will be apparent from a consideration of the accompanying specification, claims and drawings, in which:

Figure 1 is a perspective view of the improved vending machine, viewed from the rear and with portions cut away;

Figure 2 is a perspective view of the vending machine, as viewed from the front, and also with portions cut away;

Figure 3 is a vertical sectional view of the coin-operating relay structure;

Figure 8 is a section of the switch actuating mechanism and the associated price indicating wheels, the section being taken along the plane 8—8 of Figure 1;

Figure 9 is an isometric view showing the manner of mounting a switch actuating lug on a price indicating wheel;

Figure 10 is a sectional view taken along the line 10—10 of Figure 8;

Figure 11 is an external view of the lower portion of the apparatus of Figure 8 as viewed from the right;

Figure 12 is a view of a portion of the mechanism for actuating the wheels indicating the price of the dispensed liquid, and showing a portion of the means for actuating a second set of wheels for operation of the switches of the present invention;

Figure 13 is a view showing in a conventional manner the relationship between the actuating means for the wheels indicating the price and the amount of fluid dispensed and other elements of the mechanism;

Figure 14 is a side view partly in elevation and partly in section of the portion of the mechanism concerned with the reception and disposal of the coin, the section being taken along the line 14—14 of Figure 15;

Figure 15 is a sectional view of a portion of the coin receiving mechanism, the section being taken along the line 15—15 of Figure 14;

Figure 16 is a portion of a modified form of coin chute; and

Figure 17 is a top plan view of the coin gate.

Figure 5:
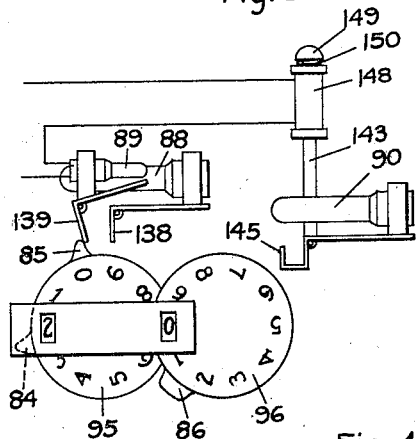
Figures 5, 6 and 7 are views of the switch apparatus actuated by the price indicating wheels and in various stages of their operation.

Referring to the drawings for a more specific understanding of the invention, the improved machine is generally indicated in Figures 1 and 2. As illustrated in these figures, the pump comprises a casing 10 having inside thereof a pipe 11 for conveying gasoline from an underground tank. The gasoline is pumped by means of a pump which is driven by a motor 15 and is associated with an air eliminator 13 of conventional form. The gasoline passes through pipe 11 and enters the air eliminator 13, which removes any air that may have accumulated in the gasoline during its passage upwardly from the storage tank. After leaving the air eliminator 13 the gasoline passes through a pipe 16 to a meter 17 and past a sight gage 18 and finally through a hose 19. The hose is provided with a valved nozzle 20 in the conventional manner. The meter 17 operates through a gear box 24 mechanism for indicating the number of gallons of liquid dispensed and the price of the dispensed liquid at the current price per gallon. A plurality of windows 21, 22 and 23 is provided for respectively indicating the price per gallon, the number of gallons, and the total price of the dispensed fluid. The apparatus which has been described so far is purely conventional in the art. The operation of this apparatus in the usual prior devices requires an attendant. Associated with the hook upon which the nozzle rests, or at any other desired location, there is a switch which controls the energization of the motor. Since such a switch is conventional in form and location, it is shown only in the wiring diagram of Figure 4, wherein it is designated by the reference characters 290 and 291. Upon the attendant removing the hook from the nozzle the motor is automatically started, and as soon as the valve in the nozzle is opened, the resulting flow of gasoline actuates the meter 17 to cause movement of the price and gallon indicating dials. Applicant's invention is concerned with improvements particularly adapted to this type of pump wherein the apparatus is automatically started by the depositing of a coin, and wherein the operation is terminated upon the delivery of an amount of gasoline corresponding in value to the deposited coin.

Generally designated by the reference numerals 26 and 27 is a pair of coin-receiving slug-detecting devices. These devices are substantially the same, except for the fact that they are adapted to receive coins of different denominations. The construction of these devices will be explained later in greater detail. Referring to Figure 14, it will be noted that these devices broadly consist of a slide 29 containing a slot 30 for the reception of a coin. Upon the slide 29 being pushed inwardly, and if the coin is of a proper size and character, the coin will pass through a chute into a second slug detecting device. The chute receiving the coin of the coin-receiving device 26 is designated by the reference numeral 32 and the associated further slug-detecting device by the numeral 33. In the case of the coin-receiving device 27, the chute is designated by the numeral 34, and the further slug-detecting device by the numeral 35. The construction of the further slug-detecting devices 33 and 35 will be described more in detail subsequently. For the present purposes it is sufficient to state that the devices are capable, by consideration of the weight, size, electromagnetic characteristics, and the electrical conductivity, of distinguishing between a legitimate coin and a counterfeit coin to a remarkable degree. If the coin is a legitimate coin it passes into a further chute 36 in the case of detector 33 and into a chute 37 in the case of slug detector 35. If, on the other hand, the coin is a counterfeit coin, it passes into an ejector tube 38, which leads to a return cup 39. It will be understood that this return cup extends through or is accessible from an opening in the front of the casing 10, so as to permit recovery of the rejected coin. In certain cases, the slug-detecting devices 33 and 35 will retain the coin. In these cases, actuation of the lever 41 of detector 33, or 42 of detector 35, will release the retained coin into ejector tube 38 for passage into the return cup 39. These levers 41 and 42 are actuated in the normal operation of the machine incidental to starting thereof, as will be explained presently.

The coin tubes 36 and 37 lead into relay units 45 and 46, respectively. Figure 3 is a sectional view of relay unit 46. It will be noted that this unit comprises a two-part casing 47 comprising chambers 48 and 49. Located in chamber 49 is an electro-magnet 50. Cooperating with this magnet 50 is a pivoted armature 51 on which is mounted a switch supporting base 52. Secured to this base is a plurality of mercury switches 53 and 54. It will be understood that these switches can be of any desired type, although I find it particularly desirable to employ metal-clad mercury switches. The switches employed throughout the mechanism are in circuit closing position when horizontally disposed, and are in circuit open position when the outer end thereof is tilted downwardly with respect to the pivot point. Thus the two switches 53 and 54 are in circuit open position as illustrated in solid lines, Figure 3. The circuit closed position of these switches is indicated in dotted lines. A spring 55 is employed to bias the armature to its deenergized position, in which position switches 53 and 54 are in their circuit open position. Pivotally connected to armature 51 and extending through a passage between the chambers 48 and 49 is a rod 57. Secured to rod 57 is an abutment member 58 adapted to be engaged by a coin. The tube 37 extends into chamber 48. Located at the lower end of the chamber 48 in the path of a coin passing through chute 37 is a gate 59 which limits the downward movement of the coin to a position adjacent the abutment member 58. Pivotally secured to the casing 47 and extending into the chamber 48 is a bell crank lever 61. A vertical arm of this lever extends upwardly adjacent the coin, which is indicated by the reference numeral 62. A horizontal arm of the lever 61 extends outwardly through a slot 63 in the floor of casing 47. Secured to the outer end of the horizontal arm of the bell crank 61 is a rod 64. As indicated in Figure 2, this rod is connected to one arm of bell crank lever 65, the other arm of which is pivotally connected to a plunger 66. The plunger 66 is provided with a pushbutton 67 at the outer end thereof. Suitable biasing means (not shown) may be provided for urging plunger 66 outwardly and consequently urging rod 64 downwardly. Upon button 67 being pushed inwardly, rod 64 is moved upwardly to rock bell crank lever 61 in a counter-clockwise direction. As will be apparent from the consideration of the dotted line position of lever 61 in Figure 3, this counter-clockwise movement of lever 61 imparts a thrust to the left to the rod 57 if a coin is present. It will be noted in this connection that the coin acts as a link between the bell crank lever 61 and the abutment member 58. This movement of rod 57 to the right causes armature 51 to be moved into engagement of the electro-magnet 50. As will be described later in connection with the operation of the machine as a whole, the movement of armature 57 to this position establishes a holding circuit so as to maintain the armature in this position upon release of push-button 67 and consequent downward movement of rod 64.

Figure 4:
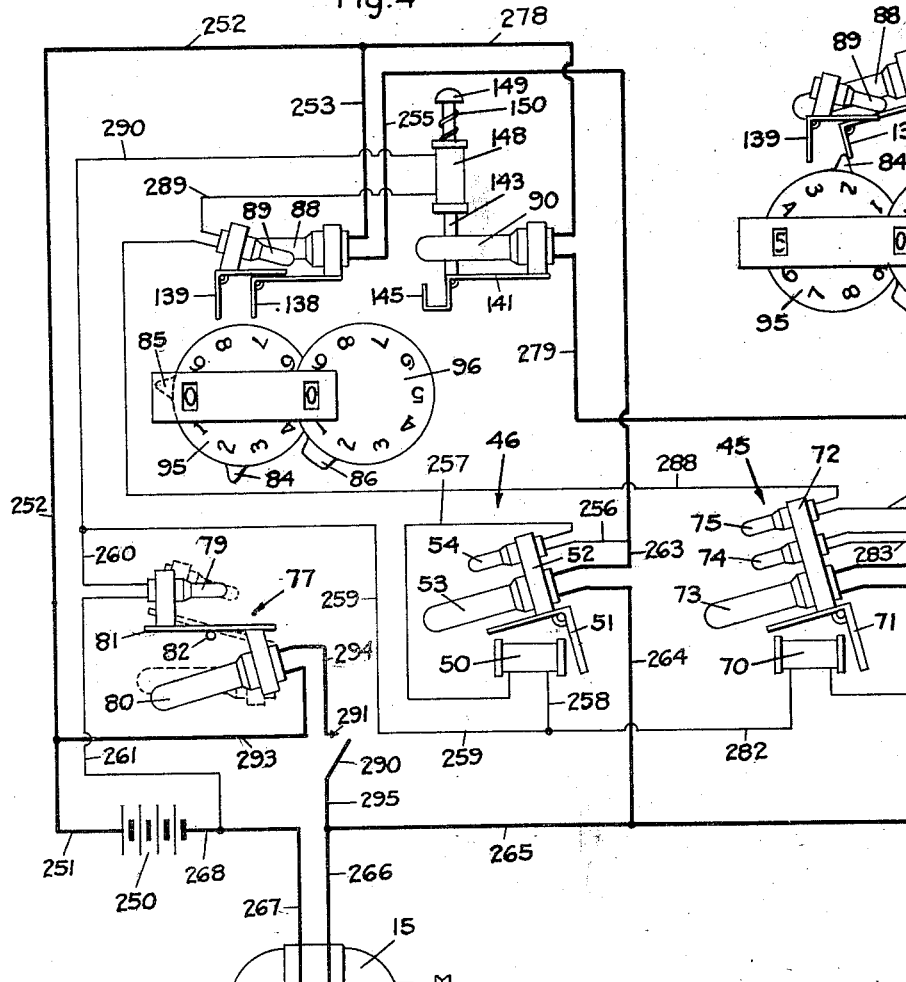
Figure 4 is a schematic wiring diagram showing the various switches of the electrical equipment employed in the apparatus.

The machine may be adapted for the receiving of two or more coins. For purposes of illustration, the machine is described in connection with the reception of twenty-five-cent and fifty-cent coins. The coin-receiving device 27 is one which is designed to receive fifty-cent coins, and the relay unit 46 is one designed to be operated by the insertion of a fifty-cent coin. The coin-receiving device 26 is designed to receive twenty-five-cent coins, and the relay unit 45 is the one which is operated by the insertion of a twenty-five-cent coin. The two relay units 45 and 46 are substantially the same, with the exception that a further switch is associated with the relay unit 45. Referring to Figure 4, the relay of relay unit 45 is illustrated schematically in the extreme right-hand portion of the figure. It will be noted that this relay comprises an electro-magnet 70, which has a pivoted armature 71 which carries a switch support 72. Secured to this switch support are mercury switches 73, 74 and 75.

Referring to Figure 1, the reference numeral 77 is employed to generally designate a switch 77 having a switch actuating knob 78. The switch 77 is provided for the purpose of transferring from manual to automatic control, or vice versa. Referring to Figure 4, it will be noted that this switch contains two mercury switches 79 and 80, which switches are secured to a common switch support, 81, secured to a shaft 82. The shaft 82 is connected to knob 78 so that rotation of knob 78 results in rotation of the switch support 81. The switches 79 and 80 are shown in full lines in Figure 4 in the position assumed when the device is operated automatically. Upon rotation of knob 78 and shaft 82 in a clockwise direction, the switches 79 and 80 are moved to the dotted line position, which is their manual position. In their automatic position, the switch 79 is closed and the switch 80 is open. In the manual position the switch 79 is open and the switch 80 is closed. The knob 78 is located within the casing so as to be inaccessible to a customer.

The portion of the automatic control system which has been described so far is concerned solely with the starting of the apparatus, it being understood that the actuation of the armatures 51 or 71 to their energized positions results in the starting of the motor 15 which drives the gasoline pump 14. As previously indicated, the present invention further provides means whereby the operation of the dispensing apparatus is automatically terminated upon the desired amount being dispensed. Referring to Figure 8, it will be generally noted that I have provided price indicating wheels with lugs 84, 85 and 86. The lugs are designed to actuate switches in the motor controlling circuit upon the desired amount of liquid being dispensed. These switches are designated by the numerals 88, 89 and 90, and are designed to either directly or indirectly control the energization of the motor. While my invention contemplates the provision of the switch actuating lugs 84, 85 and 86 on the regular price indicating dials, it is usually necessary where the invention is applied to existing gasoline dispensing machines of a computing type to provide a separate set of price indicating dials for this purpose. The reason for this is that the conventional machine of this type is not usually provided with sufficient space adjacent to the price indicating dials to permit the inclusion of the switches and their actuating mechanism. I accordingly find it necessary where the invention is to be utilized in connection with conventional machines to provide an auxiliary set of price indicating wheels in a separate housing which is designated by the numeral 92. The relation of this housing to the rest of the apparatus is best shown in Figures 1 and 8. Referring to Figure 8, it will be noted that there are three indicating wheels 94, 95 and 96. The wheel 96 indicates the last digit of the price, the wheel 95 the second, and the wheel 94 the next digit, where a decimal monetary system is used. It will be understood that for use in the United States and Canada and other countries where the dollar and cent monetary system is employed, the wheels 95 and 96 will be used to designate cents and the wheel 94, dollars. These wheels are all loosely mounted on a common shaft 97. The wheel 96 is driven by a gear 98 which is also loosely mounted on shaft 97 and is connected through an idler gear 99 to a gear 100 secured to a shaft 101. The shafts 97 and 101 are journalled in the walls of housing 92, shaft 101 extending through the left-hand wall thereof and having a gear 102 secured thereto at its outer end. The gear 102 meshes with a gear 103 which forms an element of the gear train operating the conventional gallon and price indicating wheels.

A portion of the gearing mechanism associated with this price and gallon indicating structure is indicated in Figure 12 in order to show the cooperation of gear 102 with this gearing mechanism. It will be understood that this gearing mechanism forms no part of this present invention, being of a conventional form such as shown in the patent to George W. Harness, No. 1,439,163. For a clearer understanding of the present invention, this apparatus is shown schematically in Figure 13. It will be noted that the meter 17 drives a shaft 104 which is associated with a plurality of gears 105 assembled on the shaft 104 to form a stepped cone. The gears 105 are adapted to drive through an idler gear 106, gearing means secured to a shaft 107. The position of the idler gear is determined by the setting of the price adjusting mechanism generally designated by the reference numeral 109. The speed of rotation of shaft 107 as compared with the meter shaft 104 is thus determined by the price setting. The shaft 107 has secured thereto a bevelled gear 110 which meshes with a second bevelled gear 111 and drives various price indicating dials 112, 113 and 114 through suitable gearing of the star-wheel type so as to give a jump movement to wheels 112 and 113. A bevelled gear 115 also meshes with bevelled gear 111 and drives the shaft 116, which in turn drives the auxiliary price wheels, only wheels 95 and 96 of which are shown. It is to be understood that the driving mechanism for these auxiliary price wheels is shown in Figure 13 for purely schematic purposes, and that the driving mechanism, found most practical for use with the existing types of pump, is that shown in Figures 8 and 12 and previously described. The meter shaft 104 is directly connected to a bevelled gear 118, which meshes with a bevelled gear 119 associated with a gallon indicating wheel 120. Wheel 120 drives through star-wheel gearing wheels 121 and 122. It will be understood that wheels 121 and 122 are moved with a jump action and are employed to indicate gallons and tens of gallons, respectively, while wheel 120 is used to indicate tenths of gallons. The particular units of measurement appearing upon wheels 120, 121 and 122 can, of course, be chosen in accordance with the particular units of measurement prevalent in the region in which the device is being used. Associated with the bevelled gear 119 is a bevelled gear 124, which is secured to a shaft 125. The shaft 125 drives a cam 126 through cooperating bevelled gears 127 and 128. It is to be pointed out in this connection that the driving mechanism for cam 126 is shown here in schematic form for clarity and illustration and that the specific form which applicant has found most desirable will be described later.

From Figure 13 it will be noted that as the gasoline passes through the meter 17, shaft 104 is driven at a rate solely dependent upon the rate of flow, and that this shaft positions the wheels 120, 121, and 122 indicating the amount of fluid dispensed. Also driven by shaft 104 is a cam 126, the purpose of which will be described later. Shaft 104 further drives a shaft 107 through gearing, including gears 105, the ratio of which gearing is determined by the setting of the mechanism 109 which indicates the price per gallon. The shaft 107 is accordingly driven at a rate which is dependent both upon the flow of gasoline and the price per gallon. The shaft drives a series of price indicating wheels 112, 113 and 114 and also drives the auxiliary wheels 94, 95 and 96. These latter wheels are accordingly positioned in accordance with the total price of the dispensed fluid, regardless of what the current price per gallon may be.

Referring again to Figure 8, it will be obvious that as the conventional price indicating wheels are rotated, the gear 98 will also be rotated. The gearing comprising gears 98, 99, 100, and 102 is so selected that the conventional price indicating wheels and the auxiliary price indicating wheels are driven at the same speed. The wheel 96 being driven directly by the gear 98 is driven at a uniform speed in the direction indicated in Figure 10 by the arrow on gear 98. As previously pointed out, wheels 94 and 95 are loosely secured to the shaft 97. Rigidly secured to wheel 94 is a gear 132, and rigidly secured to wheel 95 is a gear 134. Associated with gears 132 and 134 are star-wheels 135 and 136. The wheel 96 carries a lug not shown which cooperates with the star-wheel 136, so that upon each revolution of wheel 96, the star-wheel is rotated the distance between two of its teeth to impart a similar movement to gear 134. This movement is sufficient to advance the wheel 95 a distance of one numeral. Similarly, the wheel 95 upon making a complete rotation operates through the star-wheel 135 to advance the position of wheel 94 the distance of one numeral. This particular means of moving such price indicating wheels is well known and per se forms no part of the present invention.

The manner in which lugs 84, 85 and 86 are secured to the auxiliary price-indicating wheels is illustrated in Figure 9. It will be noted that the lug 86 is secured to an arcuate band 137 which is provided with slots 142. Screws 146 extend through these slots into the wheel 96. By reason of the screw and slot method of connecting the lug to the wheel, provision is made for slightly adjusting the position of the lug with respect to the wheel.

The switches 88 and 89 are secured to L-shaped supports 138 and 139. These switch supports are pivotally secured to a rod 140 secured to the housing 92. The switches 88 and 89 are biased open and closed positions respectively and are adapted to be moved to closed and open positions respectively by engagement of lugs 84 and 85 with the downwardly extending portions of switch supports 138 and 139. The switch 90 is likewise secured to a switch support 141, which switch support is pivotally secured to a plunger 143, as best indicated in Figure 10. The weight of the mercury switch tends to rotate the switch support 141 in a clockwise direction, this movement being limited by lug 144. The switch support 141 is provided with an arm which extends downwardly and terminates in a U-shaped portion, the outer leg 145 of which is adapted to be engaged under certain circumstances by the lug 86 secured to wheel 96. When switch carrier 141 is in the position indicated in solid lines, the arm 145 is out of the path of movement of lug 86. The plunger 143, supporting the switch carrier 141, has secured thereto a solenoid core 147. This core is axially movable in a solenoid coil 148 provided with an axial passage therethrough. The plunger 143 is provided with an enlarged upper end 149 and disposed between this enlarged upper end and the upper end of the coil 148 is a spring 150 which serves to bias the plunger and the core 147 upwardly to the position shown in Figure 10. Upon energization of the solenoid 148, the core 147 is moved downwardly into the field of the coil so as to move the plunger and switch carrier to the position partially indicated in dotted lines. The lower end of plunger 143 is provided with an arm 151. This arm is adapted to cooperate with a latch 152 pivotally mounted at 153. A spring 154 is secured to the lower end of this latch and is adapted to urge the upper end thereof against the arm 151. Upon plunger 143 being lowered, the biasing means 154 moves the upper portion of the latch over the arm 151 as indicated in dotted lines, so as to retain the plunger 143 in this lower position. With the plunger in this position, the arm 145 of the switch carrier 141 lies in the path of movement of lug 86, so that upon clockwise rotation of wheel 96, as viewed from Figure 10, the lug 86 strikes the arm 145, tipping the switch carrier in a counter-clockwise direction, thereby moving switch 90 to open position.

Mechanism is provided for returning the various indicating wheels to their starting position. Pumps of the computing type, with which the present invention is associated, are commonly provided with a crank whereby the price and gallon indicating wheels may be rotated directly to their zero position. Referring to Figures 8 and 11, a shaft 160 is shown as journalled in the walls of the housing 92. This shaft 160 constitutes an extension of the shaft of the conventional portion of the computing machine which is rotated for resetting the wheels. A crank 161 is mounted on shaft 160, and when moved inwardly to interlock with pins 162, is adapted to rotate shaft 160. As best indicated by Figure 11, a gear 163 is secured to shaft 160. This gear is coupled to a gear 164 through a gear train comprising gears 166, 167, and 168. As the result of this gear train, counterclockwise rotation of shaft 160 causes clockwise rotation of gear 164. Gear 164 is secured to the shaft 97 so that clockwise rotation of gear 164 causes similar rotation of shaft 97. Suitable mechanism is provided for causing such rotation of shaft 97 to turn quickly the wheels 94, 95 and 96 to their original position. It is to be understood that the rotation of shaft 160 by crank 161 causes the other price indicating wheels, as well as the gallon indicating wheels to be returned to their original positions in the conventional manner.

The rotation of shaft 160 to reset the auxiliary price indicating wheels has a further function in my device of releasing the latch 152. It will be recalled from the preceding description that the latch 152 retains the plunger 143 in its lower dotted line position. The shaft 160 carries an arm 170 which, as best shown in Figures 8 and 10, is adapted to engage the lower end of latch member 152. It will be obvious that counterclockwise rotation of shaft 160 will cause arm 170 to rotate latch 152 in a clockwise direction to release the plunger 143. The release of plunger 143 permits the biasing spring 150 to return the plunger to its normal deenergized position.

In the preceding description, the structure of the coin receiving and slug detecting devices was not specifically described. The structure of these devices will now be explained in greater detail. Referring to Figure 14, the structure of the coin receiving device 27 is shown. This device comprises a slide 29 having an opening 30, as previously described. This opening is of a proper size to receive the desired coin. The slide 29 slides between a base plate 170 and an upper plate 171. The slide is manipulated by an angularly extending portion 173 forming a finger piece. The upper plate 171 has pivotally mounted thereon, a curved arm 174. The outer end of this arm is curved downwardly and tapered to a wedge-shaped point as indicated by the numeral 175. This pointed end 175 of the arm 174 extends through an opening 176 in the upper plate 171. The arm 174 is biased downwardly by reason of its own weight or by any suitable means such as a spring. A horseshoe magnet 178 is disposed on the upper plate 171 and is securely fastened thereto. An opening 180 is provided beneath the poles of the magnet 178. The base plate 170 is provided with an opening 182 which communicates with the coin tube 34. The operation of this device will be explained later in connection with the operation of the machine as a whole.

The slug detector 35 is essentially similar to that shown and described in the patent to Tratsch et al., No. 2,151,823. For a detailed understanding of the device, reference is made to that patent. Since the novelty of the present invention resides in part in the combination of the coin detecting features of this device with other elements of the machine, the device has been illustrated in a somewhat schematic manner in Figures 14 and 15. As indicated in these figures, this slug detector 35 basically comprises two outer plates 186 and 187 and a central plate 188 which is provided with a passage running therethrough for the guiding of the coin. This passage is generally designated by the reference numeral 189. This passage comprises a vertical entrance portion 190 which directly communicates with the coin tube 34. Communicating with the vertical portion 190 is a portion 191 which slopes downwardly to the right. Projecting into the wall of the portion 191 of passage 189 is the pole 192 of a permanent magnet. The portion 191 opens into an enlarged vertical portion 193 at the lower right hand end of which is secured an anvil 195. This anvil is provided with an angular edge 196, against which the coin strikes in dropping after it leaves the lower wall of portion 191 of the passage. Communicating with the vertical portion 193 is a diagonally extending portion 197. Interposed between portions 193 and 197 of the passage is a light hinged finger 198. A coin of the proper characteristics, in dropping onto the anvil 195, will rebound from the angular edge 196 with sufficient force to tilt the finger 198 upwardly and pass into passage 197. If the coin is not of the proper characteristics, as will be explained in more detail later, the coin will drop down into a recess 199 and out through an opening 200 into a tube 201 which communicates with the ejector tube 38, as best shown in Figure 14.

The portion 197 of passage 189 communicates with a portion 203 which extends downwardly to the right into communication with a further portion 204 extending downwardly to the left. The plate 186 is provided with a pair of slots 205 and 206, these slots opening into the portion 204 of the passage. A permanent magnet 207 is secured by a clamping strap 208 to the plate 186 with the poles thereof projecting into slots 205 and 206. The permanent magnet has an extremely high flux density so that it produces a magnetic field of relatively high intensity in the passage 204. As is well known, a magnetic field tends to impede the movement of an electrically conductive member therethrough. Where the desired coin is a silver coin, this impeding effect will be very marked if the coin is a genuine one due to the extremely high conductivity of silver. The portion 204 of the passage terminates in an outlet chamber 209 which has communicating therewith outlet openings 210 and 211. Located in the outlet chamber 209 are two deflecting members 212 and 213. Each of these members is adjustably secured to the plate 187 in any desired manner. The deflecting members 212 and 213, serve to determine into which of the outlet openings 210 and 211, the falling coin will enter. It will be obvious that the coin passing through the portion 204 of the passage 189 will strike the deflecting member 212 with considerable force if its conductivity is relatively high, as would be the case with a spurious coin. The effect of a coin striking the deflecting member 212 with considerable force would be that this coin would be deflected to the right with sufficient force that it would engage deflecting member 213 on the right side of its apex so as to roll into the outlet opening 211 which communicates with the ejector tube 38. If on the other hand, the coin is of the proper high conductivity, the speed with which it moves through passage 204 will be so greatly retarded that the coil will engage deflecting member 213 on the left side of its apex and will roll out through opening 210 into the coin tube 37.

It may occasionally happen that a slightly magnetic coin will be held adjacent the poles of magnet 207 by reason of the intense magnetic field. An ejector member 215 is pivotally secured to the member 35 for the purpose of ejecting such coins. This ejector member is provided with a nose 216 adapted to enter the portion 204 of the passage when the ejector member is rotated in a counter-clockwise direction. The left-hand end of lever 42 is secured to the ejector member 215. It will be obvious that when the right hand end of lever 42 is moved upwardly, the nose 216 of ejector member 215 is moved inwardly to release any coin retained by the magnet 207. The coin, when thus released, will normally rebound from deflector member 212 into the outlet opening 211.

The tube 34 is cut away intermediate its length to provide an opening 220. A second tube 221 is secured adjacent tube 34 with its open end located immediately adjacent the opening 220. Tube 221 is connected to the tube 201, previously referred to, which in turn connects with the ejector tube 38. Hingedly secured to the tube 34 is a deflector plate 223 having an arm 224 projecting outwardly therefrom. The deflector plate 223 is shown in solid lines in the position which it occupies when the machine is not in operation. A rod 225 is provided with an arm 226 (as best shown in Figure 15), which is adapted to engage arm 224 and rotate deflector member 223 from its normal position to the position indicated by dotted lines in Figure 14. The rod 225 is connected to a lever 227 secured to a rotatable shaft 228. The left hand end of lever 227, as viewed from Figure 14, is associated with the cam 126. As previously indicated in connection with Figure 13, cam 126 is connected with the mechanism driving the gallon indicating wheels. The cam 126 is thus rotated as soon as the dispensing of the liquid is started. The cam 126 is provided with a flat portion 229 as most clearly indicated in Figure 13. The lever 227 normally bears against this flat portion so that, as soon as the cam is rotated, the lever is rocked in a counter clockwise direction as indicated by dotted lines in Figure 14. This rocking of lever 227 raises rod 225 to swing the deflecting plate 223 upwardly into its dotted line position. With the deflecting plate in this position, any coin which is introduced into the upper end of tube 34 is deflected out of opening 220 into the tube 221 so as to eventually pass out through ejector tube 38 into the return cup. In this manner, it is assured that a coin can not be inserted in the machine while the machine is in operation.

The rod 225 has a further function. This rod is connected at its lower end to a bell crank lever 231. The free arm of lever 231 is adapted to actuate the gate 59 previously referred to. As best indicated in Figure 17 this gate is generally U-shaped, including a reduced outer leg 233 which is pivotally secured at 234 to the base of the coin housing 46. The gate 59 is further provided with a vertically extending lug 235 which is adapted to be engaged by the downwardly extending arm of bell crank lever 231. The gate is biased by a spring 236 into a position in which it covers a coin slot 239 extending through the bottom of housing 46. Upon rod 225 being moved upwardly, the bell crank lever 231 is swung in a counter clockwise direction to, in turn, swing gate 59 away from slot 239, as best viewed in Figure 17. The slot 239 communicates with a tube 241 which joins with a similar tube 242 and leads into a coin safe 243, as indicated in Figure 2.

The arrangement of tube 34 and coin receiving device 27 shown in Figures 2 and 14 is the one employed where there is sufficient room in the machine to arrange the slug detecting devices 33 and 35 as shown in Figure 2. In many machines, however, it is necessary to turn at least one of these devices at right angles to the front wall in order to fit it into the available space. In such machines it is necessary to use the arrangement shown in Figure 16, wherein the slide is designated by the numeral 29' and the tube by the numeral 34'. It will be noted that the tube is arranged so that the long dimension of its cross-section is parallel to the slide in contrast to the arrangement of Figure 14.

Operation

In the following description of operation, it will be assumed that the relay unit 45 and its associated coin receiving and slug detecting devices are designed to be operated by the insertion of a twenty-five cent coin, and that the relay unit 46 and its associated coin receiving and slug detecting devices are adapted to be operated by the insertion of a fifty cent coin. The automatic operation of the device will first be considered.

Let it be assumed that the customer desires to purchase fifty cents worth of gasoline. The fifty cent coin is placed into the coin receiving opening 30 of the coin receiving device 27. Referring to Figure 14, the operator then grasps the finger-piece 173 of the slide 29 and moves the slide inwardly. The member inserted must be as small as a fifty cent piece in order for it to be inserted in the opening 30. If the member is too small, a gap will be left between the edge of the inserted member and the edge of opening 30. As the slide is moved inwardly, the tapered point 175 of lever 174 will drop down into this gap preventing further inward movement of slide 29. The coin must thus be almost exactly the same size as a fifty cent coin. If the coin inserted is a spurious coin of the type having a hole through the center, the tapered point 175 of lever 174 will drop down into this hole and prevent further inward movement of the slide. If the coin is not defective in any of these respects, the slide can be moved inwardly until the forward edge of the coin is beneath the opening 180. If the coin is of magnetic material, the forward edge of the coin will be attracted upwardly by the poles of magnet 178. The result of this will be that the forward edge of the coin will engage the forward edge of opening 180 and again prevent inward movement of slide 29. Thus if the coin is not of the proper size, if it has an opening therethrough, or if it is of magnetic material, it cannot even be inserted into the machine. If the coin, however, possess none of these defects, the slide 29 can be moved inwardly until the opening 30 is directly above the opening 182 so that the coin can drop into tube 34.

The lower end of tube 34 connects with the entrance opening 190 of slug detector 35. The coin will now pass downwardly through the portion 191 of the passage and past the magnet 192. Even though the coin may have been so slightly magnetic that it was not affected by magnet 178, the presence of magnet 192 will tend to slow up the travel of the coin. The result will be that when the coin strikes the angular edge 196 of anvil 195 the coin will not bounce with sufficient force to lift the hinged finger 198. The result will be that the coin will drop down into the recess 199 and out through opening 200 into tube 201. From this point, the coin will fall downwardly into the ejector tube 38 and finally into the return cup 39. If the coin is of non-magnetic material, which, however, is considerably lighter than silver, the inertia of the coin when it rebounds from the edge 196 of the anvil will not be sufficient to lift the hinged member 198 with the result that the coin will pass through opening 200 and into the return cup as previously described. The same will be true if the coin is of a very soft material such as lead, since the resiliency of such a material is so slight that it will not rebound with sufficient force to lift the hinged member 198.

If the coin possesses none of the defects above mentioned, it will pass into the portion 197 of the passage and downwardly through the portion 203 into the portion 204. In so doing, it will acquire an appreciable momentum, so that, when it passes by the magnet poles of magnet 207, it will be rolling at an appreciably speed. If the coin is of a highly conductive material such as silver, there will be an appreciable tendency for eddy currents to be generated in the coin as it passes through the magnetic field of magnet 207, with the result that the coin will slow down in speed. In other words, the coin will slow down in an effort to resist the induction of current therein. The result of this will be that the coin will not strike the deflecting member 212 with as much force as if it were made of a material of lower conductivity such as would normally be employed in a spurious coin. By reason of the fact that the coin does not hit the deflecting member 212 with such great force, it will drop downwardly on the left hand side of the apex of deflecting member 213 and will pass out into tube 37. If the coin has a lower conductivity, however, it will strike the deflecting member 212 with such force that it will rebound onto the right hand side of the apex of deflecting member 213 and thus pass outwardly through opening 211 into the ejector tube 38.

It will be noted from the above that the coin in passing through the coin receiving device 27 and the slug detecting device 35, enters the tube 37 and drops through this tube into the relay unit 46, where its further movement is impeded by the gate 59. The button 67 is then pushed inwardly rocking the levers 42 and 61 upwardly. The upward movement of lever 42 releases any slug that might have been retained by magnet 207 in the slug detecting device 35. The upward movement of the lever 61 in a clockwise direction acts in the presence of the coin 62 to move the armature to its energized position as previously described. When the armature is so moved, switches 53 and 54 are closed. The closure of switch 54 establishes an energizing circuit to the electromagnet 50 as follows: from one terminal of the battery 250 (Figure 4), through conductors 251, 252, and 253, switch 88, conductors 255 and 256, switch 54, conductor 257, electromagnet 50, conductors 258, 259, and 260, switch 79, and conductor 261 to the other terminal of the battery 250. It is to be understood that any other suitable source of power can be used instead of the battery 250. The establishment of the above traced circuit to electromagnet 50 results in the energization thereof so that the armature is held in its energized position regardless of the position of bell crank lever 61. Push button 67 can now be released without affecting the position of the relay.

The closure of switch 53 establishes the following energizing circuit to the pump motor 15: from one terminal of battery 250 through conductors 251, 252, and 253, switch 88, conductors 255 and 263, switch 53, conductors 264, 265, and 266, motor 15, and conductors 267 and 268 back to the other terminal of the battery 250.

Figure 7:
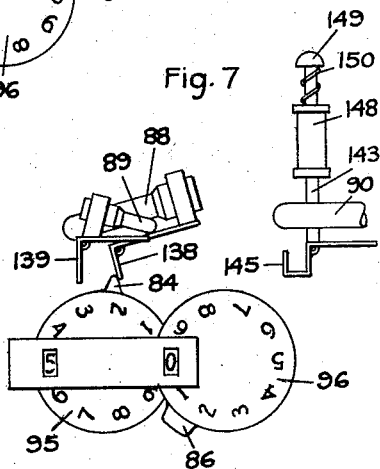

The establishment of the above traced energizing circuit to motor 15 causes the pump to be operated so that as soon as the nozzle 20 is inserted in the tank and the valve in the nozzle is opened, the gasoline will start flowing. As soon as the gasoline starts flowing, the meter 17 will drive the gallon and price indicating wheels in the manner previously described. The initial rotation of these wheels causes cam 126 to be turned so as to rock lever 227 as previously described. This shifts the deflecting plate 223 to its dotted line position to prevent the entry of another coin. Furthermore, this swings the gate 59 to permit the coin to drop into the safe 243. The pump will continue in operation until wheel 95 assumes a position wherein figure five of this wheel would be visible through the window of housing 92, where such a window is provided. When wheel 95 occupies this position, the lug 84, as shown in Figure 7, will engage the switch support 138 of switch 88 and tilt this switch to its circuit open position. It will be noted that switch 88 is included in the energizing circuits for both the electromagnet 50 and the motor 15 traced above. Thus when this switch is opened, the relay and motor are deenergized. The relay in moving to its deenergized position moves switch 54 to its open position, thereby precluding the possibility of the relay being reenergized by the subsequent closure of switch 88.

It will be noted from the above described operation that the dispensing operation is automatically terminated when fifty cents worth of gasoline has been delivered. This is true regardless of what the current price per gallon may be.

Let it be assumed that the next customer wishes to purchase twenty-five cents worth of gasoline. It is necessary for him to first reset the wheels to zero. If this is not done, the position of cam 126 will be such that the coin is deflected into tube 221 and delivered into the return cup 39. It is to be understood that a lever similar to 227 is secured to shaft 228 at a point adjacent the coin receiving device 26, and that this lever is designed to actuate a similar deflecting member and gate associated with the coin handling mechanism connected to the coin receiving device 26. Thus if the coin is inserted in either coin receiving device before the wheels are reset the coin will not be received. As previously explained, the resetting is accomplished by rotating crank 161. This resetting operation not only resets the wheels but also returns cam 126 to its normal position. When this is done, the apparatus is now in condition for the next operation.

The coin receiving device 26 is the one which is designed to receive a twenty-five cent coin. This coin in passing through the coin receiving device 26 and the slug detector 33 is subjected to a series of tests similar to those described in connection with the insertion of the fifty cent piece. The only ways in which the coin receiving device 26 and the slug detector 33 differ from the coin receiving device and slug detector previously described are in the size of the various openings and passages and the spacings of the various abutment members. If the coin is a genuine twenty-five cent coin, it will pass through tube 36 into the relay unit 45. A knob 275 is then moved inwardly to raise an arm 276 corresponding in function to rod 64. This will move the relay unit 45 to its energized position in which switches 73, 74 and 75 are closed.

Closure of switch 74 results in the following energizing circuit being established to electromagnet 70: from the left hand terminal of battery 250 through conductors 251, 252, and 278, switch 90, conductors 279, 280 and 283, switch 74, conductor 281, electromagnet 70, conductors 282, 259, and 260, switch 79, and conductor 261 to the other terminal of battery 250. The establishment of this circuit insures that the relay will remain in its energized position when the button 275 is released.

The moving of switch 73 to closed position establishes the following energizing circuit to motor 15: from the left hand terminal of battery 250 through conductors 251, 252, 278, switch 90, conductors 279, 280, and 284, switch 73, conductors 285, 265, and 266, motor 15, and conductors 267 and 268 to the other terminal of battery 250. The energization of this motor causes operation of the pump making possible the delivery of gasoline. The gallon and price indicating wheels now are turned as the gasoline is delivered to the automobile tank. The initial rotation of these wheels shifts the cam 126 to cause the coin to be dropped into the safe and to prevent the admission of another coin, as previously described in connection with the operation with a fifty-cent coin.

The problem of terminating the operation of the motor when a predetermined value of gasoline has been dispensed, is more difficult in the case of the operation with a twenty-five cent coin than it is in connection with a fifty cent coin. The reason for this is that the wheel which carries the next to the last digits, that is the tens digits, is not moved uniformly but is driven at intervals by the star wheel mechanism previously described. In other words, either the numeral 2 or the numeral 3 appears in front of the indicating window and there is no difference in the position of this wheel between the times when twenty and thirty cents worth of gasoline has been dispensed. As a result of this, it is necessary to consider the positions of both wheels 95 and 96 in determining when to terminate the dispensing operation. This is accomplished by having the tends digit wheel perform a preliminary operation to stopping when it occupies a position in which the digit two appears through the window and having the final digit wheel complete the stopping operation when the digit five appears through the window.

Figure 6:
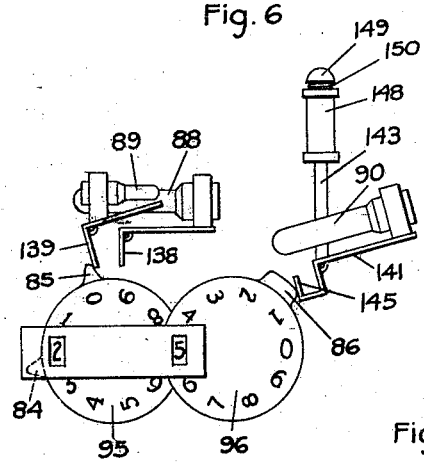

These two steps are shown in Figures 5 and 6. As soon as wheel 95 occupies the position shown in Figure 5, the lug 85 engages the switch support 139 of switch 89 to tilt this switch to closed position. The result of this closure of switch 89 is that the following circuit is established to solenoid 148: from the left hand terminal of battery 250 through conductors 251, 252, 278, switch 90, conductors 279 and 287, switch 75, conductor 288, switch 89, conductor 289, solenoid 148, conductors 290 and 260, switch 79, and conductor 261 to the other terminal of battery 250. The energization of solenoid 148 causes switch 90 and switch support 141 to move downwardly as previously described. As soon as the plunger 143 carrying the switch support 141 moves downwardly, it is retained in this lower position by the latch 152. In its new position, the arm 145 of switch support 141 lies in the path of movement of lug 86 as previously described. The result is that when the wheel 96 moves to the position shown in Figure 6 in which the digit five appears before the window, the switch support 141 and switch 90 are tilted. The tilting of switch 90 moves it to open position and interrupts all of the circuits previously traced. This will cause the relay 70 to drop to its deenergized position and will cause deenergization of the motor 15 driving the pump.

It will be noted from the foregoing description that I have provided an arrangement whereby a conventional gasoline vending machine of the meter dial type can be adapted for operation as a coin controlled machine. Provision is made for any possible contingency that might arise by carelessness or fraudulent intent on the part of the user. Thus a novel and highly effective slug detecting system is employed. Furthermore, it is assured that the machine will not receive a coin while in operation or while the wheels are in any but the starting position.

If it is desired to operate the machine in a normal manner when an attendant is present, switch 77 is turned to the manual position by rotating knob 78. This results in switch 80 being moved to the closed position and switch 79 to the open position. The opening of switch 79 prevents the establishment of any of the relay circuits previously traced. The closure of switch 80 makes possible operation of the motor by the removal of the hose nozzle from the nozzle hook on the pump. As soon as the nozzle is removed, the hook moves upwardly to move a switch blade 290 into engagement with a fixed contact 291. The closure of this switch causes the following energizing circuit to be established to motor 15: from the left hand terminal of battery 250 through conductors 251 and 293, switch 80, conductor 294, contact 291, switch blade 290, conductors 295 and 266, motor 15 and conductors 267 and 268. This circuit remains energized as long as the nozzle is off the hook and is interrupted as soon as the nozzle is replaced on the hook. Thus by a very simple switching operation, the machine can be changed from automatic to manual operation.

While a specific embodiment of the invention has been described, it is to be understood that this is for purposes of illustration only and that the invention is limited only by the scope of the appended claims.

I claim as my invention:

1. In a coin controlled mechanism, a relay comprising an electromagnet, a movable armature, and a switch positioned by said armature, said armature being biased to a first position and adapted to be held in a second position by said electromagnet when said electromagnet is energized, reciprocable actuating mechanism for said armature having a gap between two members thereof so as to normally render said actuating mechanism inoperative, one of said members being directly connected to said armature, means for introducing a coin into the gap between said two members to form a link therebetween, means including said switch for establishing a holding circuit for said relay upon said armature being moved by said actuating mechanism to said second position whereby said armature is maintained in said second position independently of said actuating mechanism, and means controlled by said relay for interrupting said holding circuit when a predetermined operation has been completed.

2. In a liquid dispensing machine for dispensing an amount of liquid corresponding to a predetermined multi-digit price, electrically operated dispensing means, liquid flow indicating means including a plurality of numeral carrying wheels for indicating the total price of the dispensed liquid, each of said wheels indicating a separate digit of the price, means for initially establishing an energizing circuit to said dispensing means, a switch controlling said circuit and movable between a normal first circuit controlling position in which said circuit is closed and a second circuit controlling position in which said circuit is open, a member associated with said switch for actuating the same from said first to said second circuit controlling position, means operated by a first of said wheels and effective when the position of said wheel corresponds to the corresponding digit of said predetermined price to cause said switch actuating member to be moved from a normal position to a second position without changing the circuit controlling position of said switch, and means operated by a second of said wheels effective when said wheel assumes a position corresponding to the other digit of said predetermined price and when said switch actuating member is in said second position to engage said switch actuating member to move said switch to said second circuit controlling position and thereby interrupt said energizing circuit.

3. In a liquid dispensing machine for dispensing an amount of liquid corresponding to a predetermined two-digit price, electrically operated dispensing means, liquid flow indicating means including a plurality of numeral carrying wheels for indicating the total price of the dispensed liquid, each of said wheels indicating a separate digit of the price, means for initially establishing an energizing circuit to said dispensing means, a switch controlling said circuit and movable between a normal first crcuit controlling position in which said circuit is closed and a second circuit controlling position in which said circuit is open, a member associated with said switch for actuating the same from said first to said second circuit controlling position, means operated by a first of said wheels and effective when the position of said wheel corresponds to the corresponding digit of said predetermined price to cause said switch actuating member to be moved from a normal position to a second position without changing the circuit controlling position of said switch, a latch for latching said member in said second position, means operated by a second of said wheels effective when said wheel assumes a position corresponding to the other digit of said predetermined price and when said switch actuating member is in said second position to engage said switch actuating member to move said switch to said second circuit controlling position and thereby interrupt said energizing circuit, means for resetting said wheels, and means operable as an incident to said resetting operation to release said latch.

4. In a liquid dispensing machine for dispensing an amount of liquid corresponding to a predetermined multi-digit price, electrically operated dispensing means, liquid flow indicating means including a plurality of numeral carrying wheels for indicating the total price of the dispensed liquid, each of said wheels indicating a separate digit of the price, means for initially establishing an energizing circuit to said dispensing means, a switch controlling said circuit and movable between a normal first circuit controlling position in which said circuit is closed and a second circuit controlling position in which said circuit is open, a member associated with said switch for actuating the same from said first to said second circuit controlling position, electromagnetic means operable when energized to cause said switch actuating member to be moved from a normal position to a second position without changing the circuit controlling position of said switch, means operable upon a first of said wheels assuming a position agreeing with the corresponding digit of the predetermined price to energize said electromagnetic means, and means operable upon a second of said wheels assuming a position corresponding to another digit of said predetermined price and upon said switch actuating member being in said second position to engage said switch actuating member to move said switch to said second circuit controlling position and thereby interrupt said energizing circuit.

5. In a liquid dispensing machine for dispensing an amount of liquid corresponding to a predetermined multi-digit price, electrically operated dispensing means, liquid flow indicating means including a plurality of numeral carrying wheels for indicating the total price of the dispensed liquid, each of said wheels indicating a separate digit of the price, means for initially establishing an energizing circuit to said dispensing means, a switch controlling said circuit and movable between a normal first circuit controlling position in which said circuit is closed and a second circuit controlling position in which said circuit is open, a member associated with said switch for actuating the same from said first to said second circuit controlling position, electromagnetic means operable when energized to cause said switch actuating member to be moved from a normal position to a second position without changing the circuit controlling position of said switch, means operable upon a first of said wheels assuming a position agreeing with the corresponding digit of said predetermined price to energize temporarily said electromagnetic means, a latch for retaining said switch actuating member in said second position, and means operable upon a second of said wheels assuming a position corresponding to another digit of said predetermined price and upon said switch actuating member being in said second position to engage said switch actuating member to move said switch to said second circuit controlling position of said switch and thereby interrupt said energizing circuit.

6. In a liquid dispensing machine for dispensing an amount of liquid corresponding to a predetermined multi-digit price, electrically operated dispensing means, liquid flow indicating means including a plurality of numeral carrying wheels for indicating the total price of the dispensed liquid, each of said wheels indicating a separate digit of the price, means for initially establishing an energizing circuit to said dispensing means, a tiltable mercury switch controlling said circuit and tiltable from a normal circuit controlling position in which said circuit is closed to a second circuit controlling position in which said circuit is open, means operable upon a first of said wheels assuming a position agreeing with the corresponding digit of said predetermined price to move said mercury switch from a first normal position to an intermediate position without tilting said switch to said second circuit controlling position, and means operable upon a second of said wheels assuming a position corresponding to another digit of said predetermined price and upon said switch being in said intermediate position to tilt said switch to said second circuit controlling position and thereby interrupt said energizing circuit.

7. In a coin controlled liquid dispensing machine, motor operated dispensing means, a motor for operating said means, means including a coin receiving device for initiating energization of said motor upon the reception of a coin, means for maintaining energization of said motor independently of said coin, a liquid meter, means including a first member driven by said meter for terminating energization of said motor when a predetermined amount of liquid has been dispensed, means including a second member driven by said meter for preventing the entrance of a coin into said coin receiving device during the dispensing operation, and means including said second member for releasing the inserted coin from said coin receiving device after liquid has started to flow through said meter.

8. In a coin controlled liquid dispensing machine, motor operated dispensing means, a motor for operating said means, means including a coin receiving device for initiating energization of said motor upon the reception of a coin, means for maintaining energization of said motor independently of said coin, a liquid meter, means including a first member driven by said meter for terminating energization of said motor when a predetermined amount of liquid has been dispensed, a coin returning chute, a coin safe, means including a second member driven by said meter for deflecting into said coin returning chute a coin inserted during the dispensing operation, and means including said second member for releasing the inserted coin from said coin receiving device into said coin safe after liquid has started to flow through said meter.

9. In a coin controlled machine, electrically operated means, a relay controlling the operation thereof and effective when moved to its energized position to initiate energization of said electrically operated means, a coin receiving device associated with said relay, coin receiving and slug detecting mechanism connected to said relay coin receiving device, a coin return chute, said slug detecting mechanism normally being operative to eject spurious coins into said coin return chute prior to their arrival in said relay coin receiving device but being operative with certain types of spurious coins to retain said coins in said mechanism, a manually reciprocable member, means associated with said member and operable upon actuation thereof to move said relay to its energized position when a coin has passed through said slug detecting mechanism into said relay coin receiving device or to eject into said coin return chute a spurious coin retained in said slug detecting mechanism, and means operable during the operation of said electrically operable means to eject any inserted coin into said return chute.

10. In a liquid dispensing machine for dispensing a predetermined amount of liquid corresponding to a predetermined price, a liquid flow line through which said liquid is dispensed, a device for controlling the flow of liquid through said line, a liquid flow meter responsive to the amount of dispensed fluid, a plurality of numeral carrying wheels, adjustable means for causing said meter to drive said numeral carrying wheels at a rate with respect to the fluid flow which corresponds to the desired price per unit volume of fluid so that said numeral carrying wheels act as an indicating means to indicate the total price of the dispensed fluid, a shaft operatively connected to said indicating means and driven therewith, means for initiating the flow of liquid through said liquid flow line, means operated by said shaft for moving said controlling device to an intermediate position preparatory to the interruption of said liquid flow when the indicating means assumes a position bearing a relation to a position corresponding to said predetermined amount of liquid, and further means operated by said shaft for moving said controlling device to completely interrupt said liquid flow when the indicating means assumes a position corresponding exactly to the desired amount of liquid.

11. In a coin controlled liquid dispensing machine for dispensing a predetermined amount of liquid corresponding to a predetermined price, a liquid flow line through which liquid is dispensed, an electrically operated controller for said liquid flow line, a liquid flow meter responsive to the amount of dispensed fluid, a plurality of numeral carrying wheels, adjustable means for causing said meter to drive said numeral carrying wheels at a rate with respect to the fluid flow which corresponds to the desired price per unit volume of fluid so that such numeral carrying wheels act as an indicating means to indicate the total price of the dispensed fluid, a shaft operatively connected to said indicating means and driven therewith, means for establishing an energizing circuit to said controller to initiate a flow of liquid through said liquid flow line, a switch controlling said circuit, actuating means for said switch, means operated by said shaft for moving said switch actuating means to an intermediate position preparatory to actuation of said switch to interrupt said energizing circuit when the indicating means assumes a position bearing a predetermined relation to a position corresponding to said predetermined amount of liquid, and further means operated by said shaft for moving said switch actuating means to complete said switch actuation when the indicating means assumes a position corresponding exactly to the desired amount of liquid.

12. In a device of the class described, a plurality of numeral carrying wheels, means for rotating the same, each of said wheels indicating a separate digit of a predetermined amount, a switch movable between open and closed circuit controlling positions and normally assuming one of said positions, a member associated with said switch for actuating the same to the other of said circuit controlling positions, means operated by a first of said wheels and effective when the position of said wheel corresponds to the corresponding digit of said amount to cause said switch actuating member to be moved from a normal position to a second position without changing the circuit controlling position of said switch, and means operated by a second of said wheels effective when said wheel assumes a position corresponding to the other digit of said predetermined amount and when said switch actuating member is in said second position to engage said switch actuating member to cause said switch to move to said other circuit controlling position.

13. In a device of the class described, a plurality of numeral carrying wheels, means for rotating the same, each of said wheels indicating a separate digit of a predetermined amount, a switch movable between open and closed circuit controlling positions and normally assuming one of said positions, a member associated with said switch for actuating the same to the other of said circuit controlling positions, electromagnetic means operable when energized to cause said switch actuating member to be moved from a normal position to a second position without changing the circuit controlling position of said switch, means operable upon a first of said wheels assuming a position agreeing with the corresponding digit of the predetermined amount to energize said electromagnetic means, and means operable upon a second of said wheels assuming a position corresponding to another digit of said predetermined amount and upon said switch actuating member being in said second position to engage said switch actuating member to cause said switch to move to said other circuit controlling position.

14. In a coin controlled dispensing device, dispensing means, coin controlled means for controlling energization of said dispensing means, a meter driven in accordance with the rate of dispensing of the dispensed medium, a coin receiving chute, a second chute communicating with said coin receiving chute and leading to said coin controlled means, an ejection chute having one end adjacent the outlet end of said coin receiving chute, a deflecting member movable from a normal position in which said coin receiving chute and second chute are in communication and a second position in which coins leaving said coin receiving chute are deflected into said coin ejection chute, and means positioned by said meter after the dispensing operation has been initiated for moving said deflecting member from said normal position to said second position.

JOHN M. ALEXANDER.